(12) United States Patent
Barrette et al.

(10) Patent No.: US 8,277,347 B2
(45) Date of Patent: Oct. 2, 2012

(54) TENSIONER

(75) Inventors: Simon Barrette, Lansing, NY (US);
Kazuyuki Miyake, Mie (JP)

(73) Assignee: BorgWarner Morse TEC Japan K.K.,
Nabari-shi (JP)

( * ) Notice: Subject to any disclaimer, the term of this patent is extended or adjusted under 35 U.S.C. 154(b) by 598 days.

(21) Appl. No.: 12/305,671

(22) PCT Filed: May 30, 2007
(Under 37 CFR 1.47)

(86) PCT No.: PCT/JP2007/061410
§ 371 (c)(1),
(2), (4) Date: Dec. 19, 2008

(87) PCT Pub. No.: WO2008/001587
PCT Pub. Date: Jan. 3, 2008

(65) Prior Publication Data
US 2011/0130232 A1    Jun. 2, 2011

(30) Foreign Application Priority Data

Jun. 29, 2006    (JP) .................................. 2006-179096

(51) Int. Cl.
*F16H 7/08* (2006.01)
*F16H 7/22* (2006.01)

(52) U.S. Cl. ......... 474/101; 474/109; 474/110; 474/111

(58) Field of Classification Search .................. 474/101, 474/109, 110, 111
See application file for complete search history.

(56) References Cited

U.S. PATENT DOCUMENTS
5,704,860 A    1/1998    Stief
(Continued)

FOREIGN PATENT DOCUMENTS
DE    1650620    1/1970
(Continued)

OTHER PUBLICATIONS
PCT Search Report; PCT/JP2007/061410; Mar. 3, 2007, 13 pages.

*Primary Examiner* — Michael Mansen
*Assistant Examiner* — Minh Truong
(74) *Attorney, Agent, or Firm* — Brown & Michaels, PC

(57) ABSTRACT

The present invention is directed to decrease the impact sound of the ratchet mechanism generated at the time of piston retraction. The tensioner includes a piston 3 slidable in the piston bore 2a of the housing 2 and an expandable circlip member 5 engageable with the engagement groove 3a of the piston 3. The piston bore 2a has a guide groove 20 formed therein that has front and rear stop surfaces 20a, 20b adapted to contact the circlip member 5. The engagement groove 3a is formed by a round seat portion $S_0$ that the circlip member 5 is adapted to seat, a piston-retraction restricting portion $S_0S_1$ that is formed on the front side of the round seat portion $S_0$ and a piston-advance permitting portion $S_0S_2$ that is formed on the front side of the round seat portion $S_0$. The piston-retraction restricting portion $S_0S_1$ permits the circlip member 5 to travel a short distance toward the front side along the rear side stop surface 20b to allow for an enlargement of the circlip member 5 and to restrict retraction of the piston 3 when the piston 3 retracts and the circlip member 5 contacts the rear side stop surface 20b of the guide groove 20.

13 Claims, 9 Drawing Sheets

U.S. PATENT DOCUMENTS

| | | |
|---|---|---|
| 6,849,012 B2 | 2/2005 | Poiret et al. |
| 7,455,607 B2 * | 11/2008 | Narita et al. .................. 474/109 |
| 2003/0139235 A1 * | 7/2003 | Yamamoto et al. ........... 474/109 |
| 2004/0138018 A1 | 7/2004 | Hayakawa et al. |
| 2004/0266571 A1 | 12/2004 | Izutsu et al. |
| 2004/0266573 A1 * | 12/2004 | Yoshida et al. ............... 474/110 |
| 2005/0049093 A1 * | 3/2005 | Sato et al. ..................... 474/101 |

FOREIGN PATENT DOCUMENTS

| | | |
|---|---|---|
| DE | 3249504 | 5/1984 |
| DE | 19680418 | 11/2001 |
| EP | 1411271 | 4/2004 |
| EP | 1653121 | 3/2006 |
| EP | 1760364 | 3/2007 |
| JP | 2000337461 | 12/2000 |
| JP | 2001082558 | 3/2001 |
| JP | 2001146946 | 5/2001 |
| JP | 2001355691 | 12/2001 |
| JP | 2002005250 | 1/2002 |
| JP | 2003329091 | 11/2003 |
| JP | 2005042860 | 2/2005 |
| JP | 2005344872 | 12/2005 |
| JP | 2006029377 | 2/2006 |
| RU | 2178847 | 1/2002 |
| WO | 2005059404 | 6/2005 |

\* cited by examiner

Normal Operation

Advance of Piston (a)

Further Advance of Piston (b)

Retraction of Piston (a)

Restriction of
Retraction of Piston (b)

Normal Operation

Advance of Piston (a)

Further Advance of Piston (b)

Retraction of Piston (a)

Restriction of Retraction of Piston (b)

TENSIONER

TECHNICAL FIELD

The present invention relates to a tensioner with a ratchet mechanism having a circlip member that engages with the engagement grooves formed on the outer circumferential surface of a piston. More particularly, the invention relates to an improvement in the structure of the tensioner to relieve an impact load to decrease impact sound that occurs in the ratchet mechanism when a chain or belt pushes the piston to retract.

BACKGROUND ART

Generally, in timing chains in use for valve drives of internal combustion engines, cam shaft chains in use for camshaft-camshaft drives, and balancer chains, tensioners have been used on the slack side of the chain to take up slack in the chain and to apply tension to the chain.

During operation, a piston of the tensioner presses against the chain to maintain tension in the chain. Also, during operation, when tension in the chain increases due to resonance of a chain span, an excessive shock load from the chain acts on the piston of the tensioner, causing the piston to retract into the housing of the tensioner.

In order to prevent such retraction of the piston, a tensioner device with a ratchet mechanism has been proposed as shown in Japanese patent application publication No. 2002-5250 (hereinafter referred to as JP 2002-5250).

The above-mentioned ratchet mechanism, as shown in FIG. 3 of JP 2002-5250, is comprised of a plurality of engagement grooves formed on the outer circumferential surface of the piston, a circlip that engages with an engagement groove, and a guide groove formed in the inner circumferential surface of the piston bore in the vicinity of the opening end of the piston bore of the housing. Each of the engagement grooves is formed of a front side tapered surface and a rear side tapered surface that are connected to each other via a curved surface at the deepest portion of the groove. The guide groove is formed of a first tapered stop that the circlip contacts at the time of the rearward movement of the piston and a second tapered stop that the circlip contacts at the time of the forward movement of the piston. Also, par [0045] of JP 2002-5250 describes that it is preferable to make the front side tapered surface of the engagement groove of the piston generally parallel with the tapered surface of the first stop of the guide groove in order to securely prevent retraction of the piston.

In this case, during operation, when the piston moves in the forward direction the rear side tapered surface of the engagement groove of the piston travels over the circlip with the circlip around the outer circumferential surface of the piston contacted by the second stop of the guide groove, and the movement of the piston in the forward direction is thus permitted. On the other hand, when the piston moves in the rearward direction the circlip around the outer circumferential surface of the piston is sandwiched between the front side tapered surface of the engagement groove of the piston and the first stop of the guide groove, and the movement of the circlip is restricted, preventing the piston from retracting.

In the above-mentioned ratchet mechanism of prior art, when the piston has retracted, the circlip fitted around the outer circumferential surface of the piston impacts the first stop of the guide groove of the housing to cause an impact sound. Recently, there has been a demand in the art for decreasing the impact sound generated at the time of piston retraction.

The present invention is directed to decreasing the impact sound by relieving the impact load generated at the time of retraction of the piston of the tensioner with a ratchet mechanism.

DISCLOSURE OF INVENTION

A tensioner according to the present invention is comprised of a piston having a plurality of engagement grooves on its outer circumferential surface, an expandable circlip member fitted around the engagement groove, and a housing that has a piston bore receiving the piston slidably in the axial direction and that has a guide groove formed along the inner circumferential *surface of the piston bore. The guide groove has a front side stop and a rear side stop that the circlip member is adapted to contact during travel of the piston. The engagement groove is formed of a round seat portion that has the deepest portion of the engagement groove and that the circlip member is adapted to seat, a piston-retraction restricting portion that is formed on the front side (or on the side toward the distal end of the piston) of the round seat portion, and a piston-protrusion permitting portion that is formed on the rear side (or on the side toward the proximal end of the piston) of the round seat portion. The piston-protrusion permitting portion is formed in such a manner as to permit protrusion of the piston when the circlip member contacts the front side stop of the guide groove during the protrusion of the piston and as to permit the piston-protrusion permitting portion to travel over the circlip member when the piston travels farther. The piston-retraction restricting portion is formed in such a manner as to permit a short travel in the forward direction along the rear side stop of the circlip member to allow extension of the circlip member and to restrict retraction of the piston when the circlip member contacts the rear side stop of the guide groove during retraction of the piston.

According to the present invention, during operation, when the piston advances or moves in the protruding direction, the circlip member seated on the round seat portion of the engagement groove of the piston travels along with the piston and contacts the front side stop of the guide groove of the housing. When the piston travels farther, the piston-protrusion permitting portion of the engagement groove of the piston travels over the circlip member to permit advance of the piston.

On the other hand, when the piston retracts, the circlip member seated on the round seat portion of the engagement groove of the piston travels along with the piston and contacts the rear side stop of the guide groove of the housing. From this state, as the circlip member travels along the piston-retraction restricting portion Of the engagement groove of the piston the circlip member elastically deforms to expand and travels a short distance in the forward direction along the rear side stop of the guide groove. Thereby, impact can be relieved when the circlip member impacts the rear side stop and the impact sound at the time of piston retraction can thus be decreased.

The piston-retraction restricting portion of the engagement groove of the piston may be formed of a first round surface with a radius of curvature greater than a radius of curvature of a cross sectional shape of the circlip member and a second round surface with a radius of curvature substantially equal to the radius of curvature of the cross sectional shape of the circlip member. The second round surface holds the circlip member to sandwich the circlip member with the tapered surface of the guide groove at the time of restriction of piston-retraction and acts to restrict extension of the circlip member.

In this case, when the piston retracts, as the circlip member travels along the first round surface at the piston-retraction restricting portion of the engagement groove of the piston, the circlip member elastically deforms to extend and moves forward along the tapered surface of the guide groove. Thereby, the impact sound at the time of piston retraction can be decreased. Thereafter, since the circlip member is more securely held by the second round surface at the piston-retraction restricting portion of the engagement groove of the piston, retraction of the piston can be securely restricted.

The rear side stop of the guide groove of the housing may be formed of a tapered surface that leaves the axial centerline of the piston bore toward the front side and that inclines relative to the axial centerline of the piston bore. The piston-retraction restricting portion of the engagement groove of the piston is formed of a round surface that is connected continuously to the round seat portion and that has a radius of curvature greater than a radius of curvature of a cross sectional shape of the circlip member, and a tapered surface that is connected to the round surface, that leaves the axial centerline of the piston bore toward the front side and inclines relative to the axial centerline of the piston bore, and that gradually narrows the distance between the tapered surface and the rear side stop of the guide groove toward the front side or that is parallel to the rear side stop of the guide groove. The tapered surface at the piston-retraction restricting portion sandwiches the circlip member with the tapered surface of the guide groove at the time of restriction of piston-retraction and acts to restrict extension of the circlip member.

In this case, when the piston retracts, as the circlip member travels along the round surface at the piston-retraction restricting portion of the engagement groove of the piston, the circlip member elastically deforms to extend and moves forward along the tapered surface of the guide groove. Thereby, the impact sound at the time of piston retraction can be decreased. Thereafter, since the circlip member is sandwiched between the tapered surface at the piston-retraction restricting portion of the engagement groove of the piston and the tapered surface of the guide groove, retraction of the piston can be securely restricted.

The piston-retraction restricting portion of the engagement groove of the piston may be formed of a tapered surface that leaves the axial centerline of the piston bore toward the front side and that inclines relative to the axial centerline of the piston bore, and a round surface that has a radius of curvature substantially equal to a radius of curvature of a cross sectional shape of the circlip member. The round surface holds the circlip member to sandwich the circlip member with the tapered surface of the guide groove at the time of restriction of piston-retraction and acts to restrict extension of the circlip member.

In this case, when the piston retracts, as the circlip member travels along the tapered surface at the piston-retraction restricting portion of the engagement groove of the piston, the circlip member elastically deforms to extend and moves forward along the tapered surface of the guide groove. Thereby, the impact sound at the time of piston retraction can be decreased. Thereafter, since the circlip member is securely held by the round surface at the piston-retraction restricting portion of the engagement groove of the piston, the retraction of the piston can be securely restricted.

The rear side stop of the guide groove of the housing may be formed of a tapered surface that leaves the axial centerline of the piston bore toward the front side and that inclines relative to the axial centerline of the piston bore. The piston-retraction restricting portion of the engagement groove of the piston is formed of a first tapered surface that is connected continuously to the round seat portion and that leaves the axial centerline of the piston bore toward the front side and inclines relative to the axial centerline of the piston bore, and a second tapered surface that is connected to the first tapered surface, that leaves the axial centerline of the piston bore toward the front side and inclines relative to the axial centerline of the piston bore, and that gradually narrows the distance between the second tapered surface and the rear side stop of the guide groove toward the front side or that is parallel to the rear side stop of the guide groove. The second tapered surface sandwiches the circlip member with the tapered surface of the guide groove at the time of restriction of piston-retraction and acts to restrict extension of the circlip member.

In this case, when the piston retracts, as the circlip member travels along the first tapered surface at the piston-retraction restricting portion of the engagement groove of the piston, the circlip member elastically deforms to extend and moves forward along the tapered surface of the guide groove. Thereby, the impact sound at the time of piston retraction can be decreased. Thereafter, since the circlip member is sandwiched between the second tapered surface at the piston-retraction restricting portion of the engagement groove of the piston and the tapered surface of the guide groove, retraction of the piston can be securely restricted.

The rear side stop of the guide groove of the housing may be formed of a tapered surface that leaves the axial centerline of the piston bore toward the front side and that inclines relative to the axial centerline of the piston bore. Also, the piston-retraction restricting porting of the engagement groove of the piston may have a tapered surface on the front side that is inclined relative to the tapered surface of the guide groove so as to enlarge the distance between the tapered surface of the guide groove and the tapered surface of the engagement groove.

In this case, when the piston retracts, as the circlip member travels along the tapered surface at the piston-retraction restricting portion of the engagement groove of the piston, the circlip member elastically deforms to expand and moves toward the front side along the tapered surface of the guide groove. Thereby, the impact sound at the time of piston retraction can be reduced.

The rear side stop of the guide groove of the housing may be formed of a tapered surface that leaves the axial centerline of the piston bore toward the front side and that inclines relative to the axial centerline of the piston bore. Also, the piston-retraction restricting portion of the engagement groove of the piston may have a round surface that is formed in such a manner as to enlarge the distance between the tapered surface of the guide groove and the round surface toward the front side and that has a radius of curvature greater than a radius of curvature of a cross sectional shape of the circlip member.

In this case, when the piston retracts, as the circlip member travels along the round surface at the piston-retraction restricting portion of the engagement groove of the piston, the circlip member elastically deforms to expand and moves toward the front side along the tapered surface of the guide groove. Thereby, the impact sound at the time of piston retraction can be reduced.

The enlargement restricting surface is formed on the guide groove to connect the rear side stop in such a manner as to sandwich the circlip member between the piston-retraction restricting portion of the engagement groove and the enlargement restricting surface to restrict the enlargement of the circlip member at the time of restriction of piston-retraction.

In this case, at the time of restricting of piston-retraction, since the enlargement restricting surface of the guide groove of the housing sandwiches the circlip member between the piston-retraction restricting portion of the engagement groove of the piston and the enlargement restricting surface of the guide groove, enlargement of the circlip member can be securely restricted and retraction of the piston can thus be securely restricted.

The enlargement restricting surface may be formed of a cylindrical surface that is parallel to the axial centerline of the piston bore.

The tensioner may have an expandable circlip member that is adapted to engage with an engagement groove formed around the outer circumferential surface of the piston, and a ratchet mechanism to restrict retraction of the piston. The engagement groove is formed in such a manner as to permit a short travel of the circlip member toward the distal end of the piston at the time of piston retraction to enlarge the circlip member.

In this case, when the piston retracts, the circlip member travels a short distance along the engagement groove of the piston toward the distal end of the piston to elastically deform to expand. Thereby, the impact can be relieved when the circlip member impacts the surface on the housing side. As a result, the impact sound at the time of piston retraction can be reduced. Also, the amount of a travel of the piston caused by a short travel of the circlip member is preferably 0.1 to 0.2 mm.

According to the present invention, when the circlip member comes into contact with the rear side stop of the guide groove of the housing at the time of retraction of the piston, the circlip member travels a short distance toward the front side on the piston-retraction restricting portion of the engagement groove along the rear side stop of the guide groove to elastically deform to expand. Thereby, the impact can be relieved when the circlip member impacts the rear side stop, and as a result, the impact sound can be decreased at the time of piston retraction.

BEST MODE FOR CARRYING OUT THE INVENTION

Figure 1:
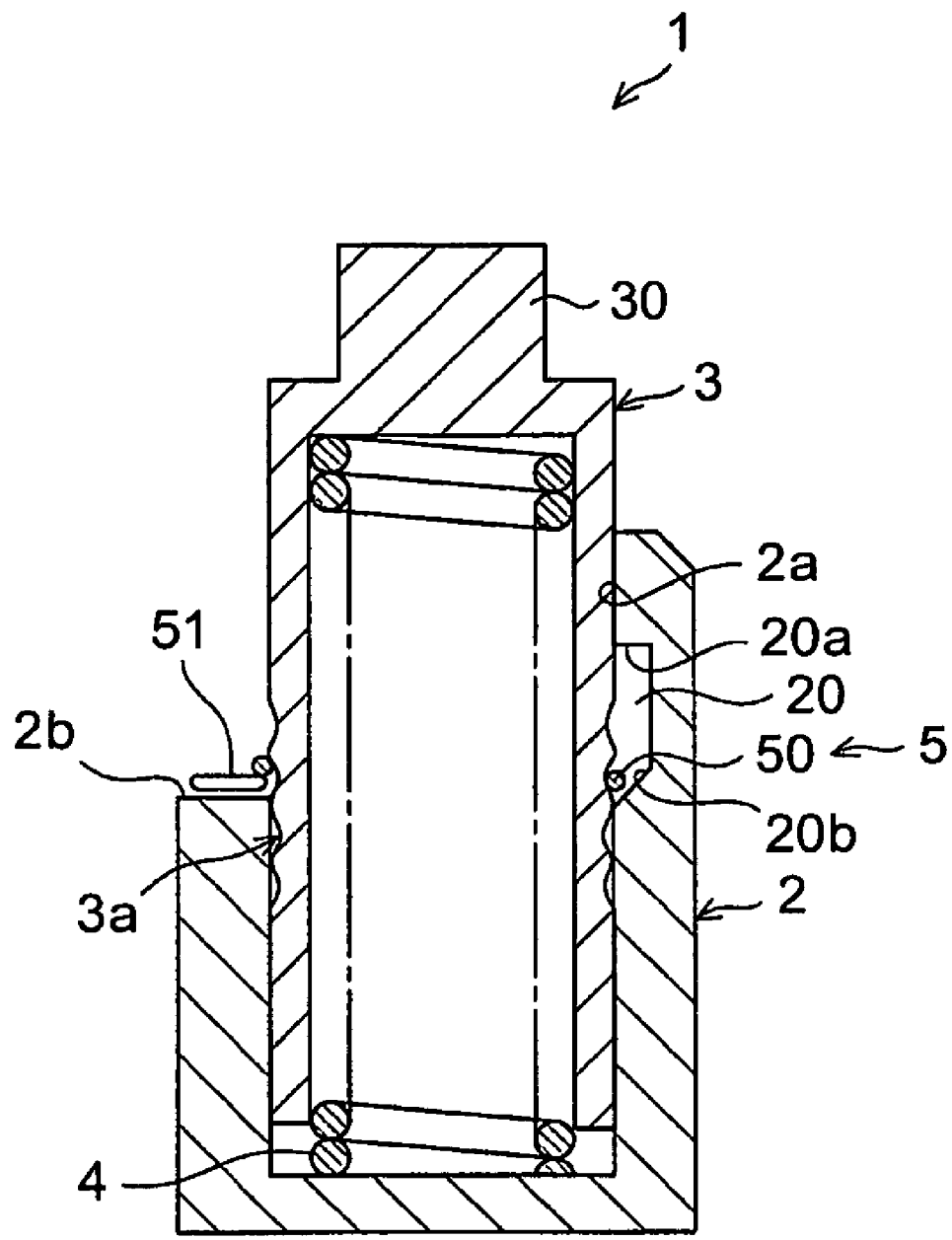
FIG. 1 is a longitudinal sectional view of a tensioner according to an embodiment of the present invention.
Figure 2:
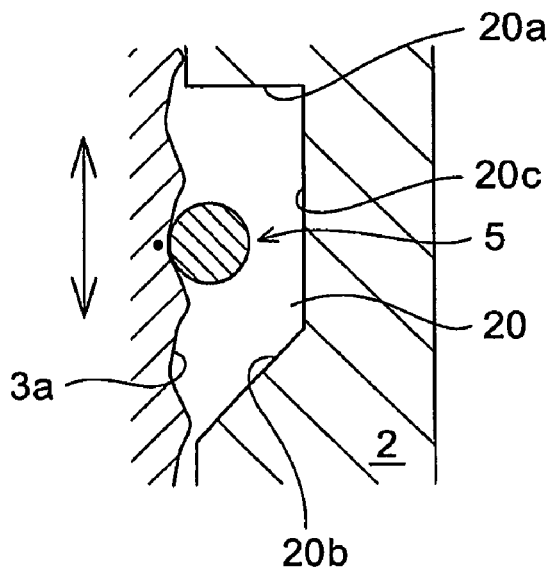
FIG. 2 is an enlarged view of FIG. 1, illustrating the action of the ratchet mechanism during normal operation.
Figure 3:
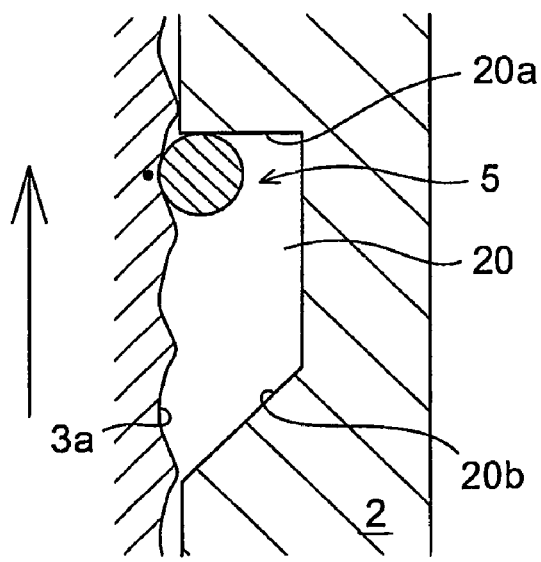
FIG. 3 is an enlarged view of FIG. 1, illustrating the action of the ratchet mechanism at the time of piston advance.
Figure 3:
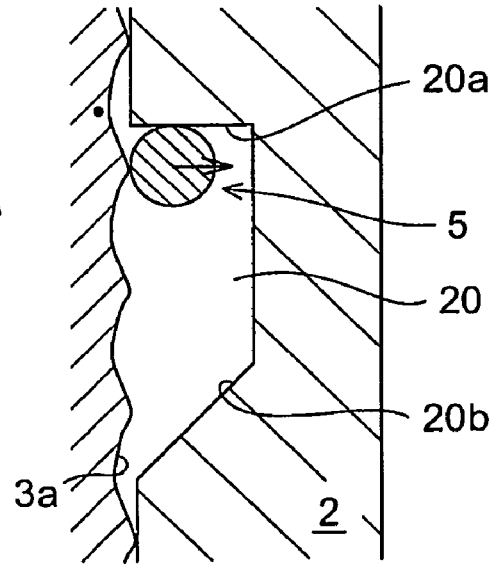
Figure 4:
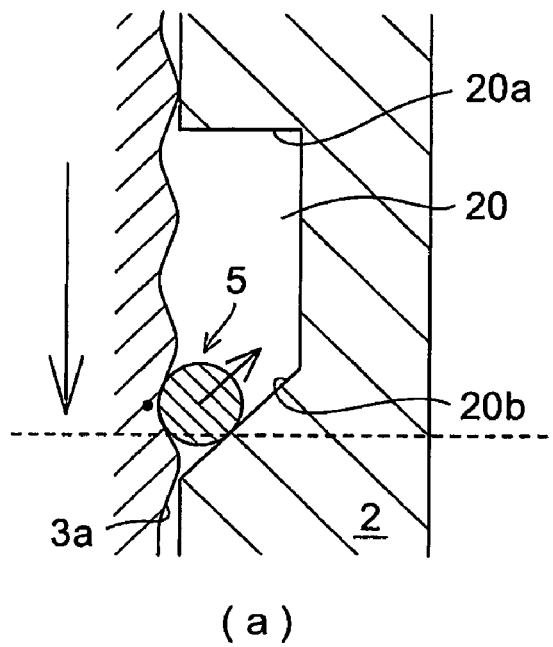
FIG. 4 is an enlarged view of FIG. 1, illustrating the action of the ratchet mechanism at the time of piston retraction.
Figure 4:
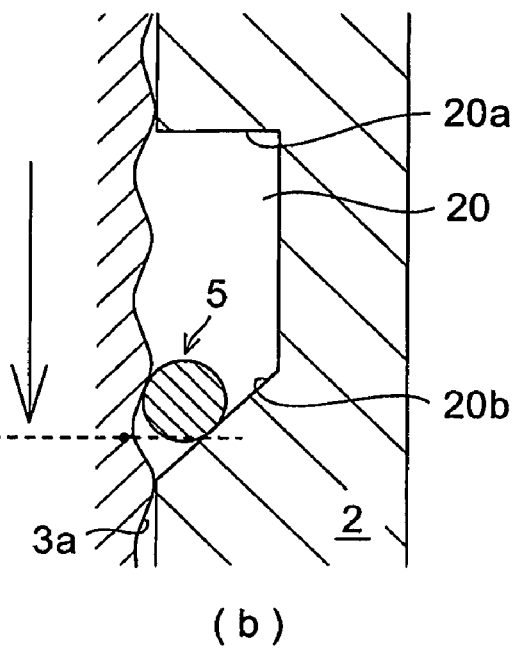
Figure 5:
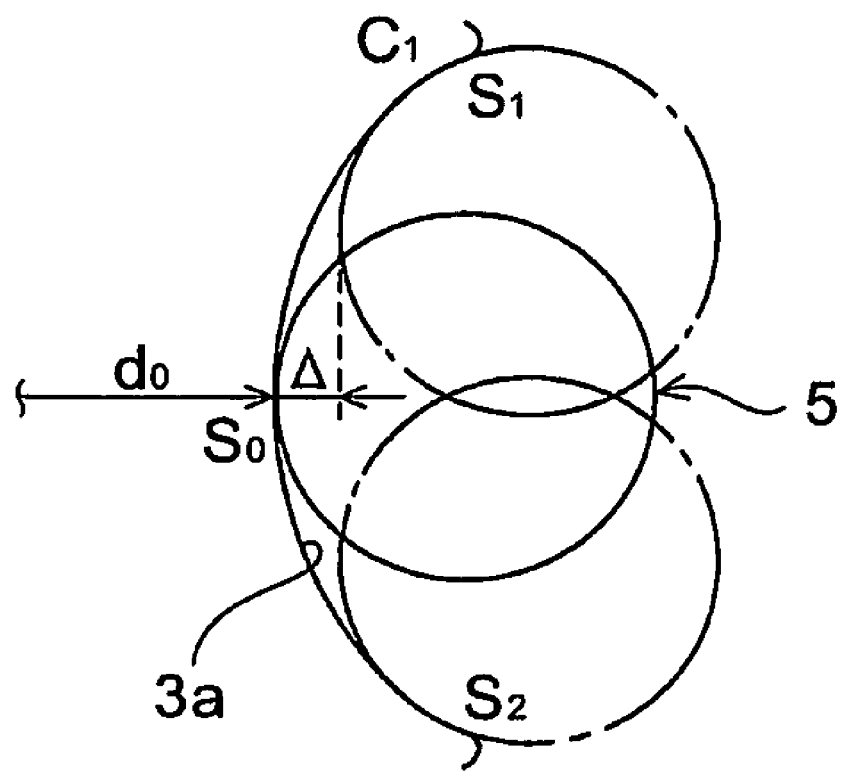
FIG. 5 is an enlarged view of the engagement groove of the piston and the circlip member of the tensioner of FIG. 1.
Figure 6:
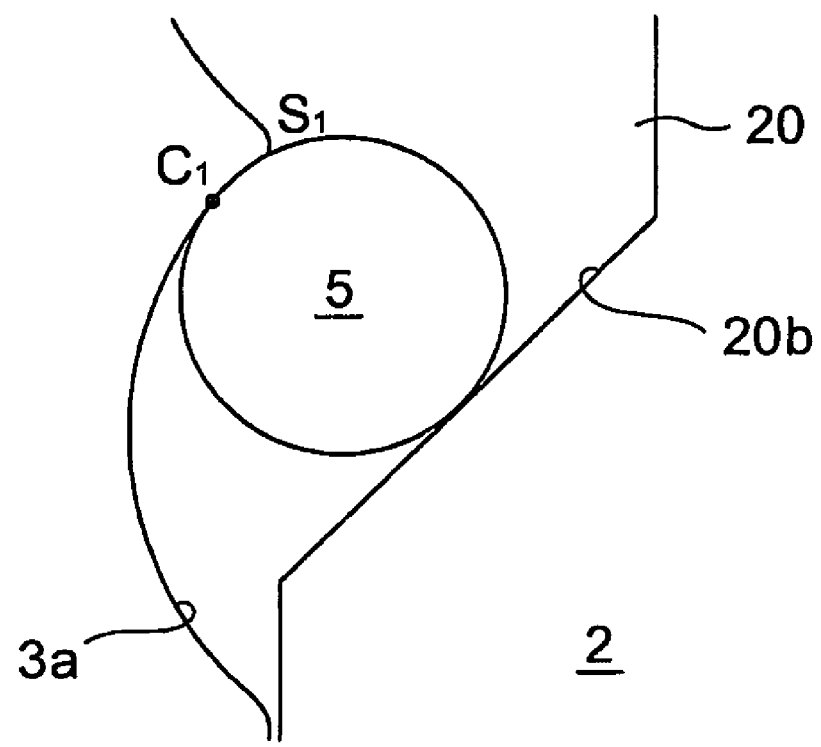
FIG. 6 is a schematic illustrating the action of the ratchet mechanism of the tensioner of FIG. 1 at the time of restriction of the piston-retraction, corresponding to the enlarged view of a portion of FIG. 4(b)

Embodiments of the present invention will be hereinafter described in accordance with the appended drawings. FIGS. 1 to 6 show a tensioner with a ratchet mechanism according to an embodiment of the present invention. FIG. 1 is a longitudinal sectional view of a tensioner with a ratchet mechanism. FIGS. 2 to 4 illustrate the action of the ratchet mechanism. FIG. 5 is an enlarged view of the engagement groove of the piston and the circlip member. FIG. 6 is a schematic illustrating the action of the ratchet mechanism at the time of restriction of the piston-retraction, corresponding to the enlarged view of a portion of FIG. 4(b).

As shown in FIG. 1, a tensioner 1 is comprised of a housing 2 having an axially extending piston bore 2a with an opening end and a guide groove 20 formed along the inner circumferential surface of the piston bore 2a at the opening end of the piston bore 2a, a hollow piston 3 slidably supported in the piston bore 2a and having a plurality of engagement grooves 3a formed on the outer circumferential surface of the piston 3, and a circlip member 5 fitted in the engagement groove 3a of the piston 3.

The tensioner 1 also has a piston spring 4 fitted in the piston bore 2a of the housing 2 and biasing the piston 3 in the protruding direction from the housing 2. In addition, the present invention has application not only to a mechanical tensioner without an external oil supply as shown in the embodiment of the present invention but also to an hydraulic tensioner with oil supply from an external source of oil. Also, the tensioner 1 can be applied to a belt as well as a chain.

At a portion of the opening end of the piston bore 2a of the housing 2 is formed a notch 2b penetrating radially through the housing 2 to the piston bore 2a. The circlip member 5 is formed of an expandable ring-shaped body 50 that is engageable with the engagement groove 3a of the piston 3 and a pair of X-shaped handles 51 which extend from the ends of the ring-shaped body 50 so that an operator can pinch the handles 51 to expand the ring-shaped body 50. The handles 51 extend into the notch 2b of the housing 2.

The guide groove 20 of the housing 2 has a front side stop 20a and a rear side stop 20b that are adapted to be contacted by the circlip member 5. The front side stop 20a extends generally perpendicular to the piston bore 2a of the housing 2 and the rear side stop 20b has a tapered surface that leaves the axial centerline of the piston bore 2a toward the distal end 30 of the piston 3 and that inclines relative to the axial centerline of the piston bore 2a. The front side stop 20a and the rear side stop 20b are connected to each other by a cylindrical surface 20c extending parallel to the axial centerline of the piston bore 2a (see FIG. 2).

As shown in FIG. 5, the engagement groove 3a of the piston 2 is formed of a round seat portion $S_0$ that has the deepest portion (or the smallest diameter portion $d_0$) of the engagement groove 3a and that is adapted to be seated by the circlip member 5 during normal operation, a piston-retraction restricting portion $S_0S_1$ that is formed in front of the round seat portion $S_0$, and a piston-advance permitting portion $S_0S_2$ that is formed at the rear of the round seat portion $S_0$.

The piston-advance permitting portion $S_0S_2$ is formed in such a manner as to permit advance of the piston 3 when the circlip member 5 contacts the front side stop 20a of the guide groove 20 and as to travel over the circlip member 5 when the piston 3 advances farther from the state in which the circlip member 5 is in contact with the front side stop 20a of the guide groove 20.

The piston-retraction restricting portion $S_0S_1$ is formed in such a manner as to permit a small travel of the circlip member 5 in the forward direction along the rear side stop 20*b* to allow expansion of the circlip member 5 when the circlip member 5 comes into contact with the rear side stop 20*b* of the guide groove 20 during retraction of the piston 3, and as to restrict retraction of the piston 3.

More specifically, the piston-retraction restricting portion $S_0S_1$ is formed of a first round surface $S_0C_1$ that passes though the round seat portion $S_0$ (or that is continuously connected to the round seat portion $S_0$) and that has a radius of curvature greater than a radius of curvature of a round cross sectional shape of the circlip member 5, and a second round surface $C_1S_1$ that is continuously connected to the first round surface $S_0C_1$ and that has a radius of curvature generally equal to the radius of curvature of the cross sectional shape of the circlip member 5.

As shown in a dash-and-dot line of FIG. 5, when the circlip member 5 is in contact with the second round surface $C_1S_1$ there is a clearance Δ formed between the round seat portion $S_0$, or the deepest portion of the engagement groove 3*a*, and the circlip member 5. Thereby, when the circlip member 5 travels from the round seat portion $S_0$ to the second round surface $C_1S_1$ the circlip member is expanded by the amount of clearance Δ. Also, the second round surface $C_1S_1$ acts to hold and sandwich the circlip member 5 between the tapered surface 20*b* of the guide groove 20 and the second round surface $C_1S_1$ to restrict expansion of the circlip member 5.

Then, the action of the above-mentioned tensioner will be explained using FIGS. 2 to 6.

During normal operation of the tensioner 1, as shown in FIG. 2, the circlip member 5 is disposed in the guide groove 20 of the housing 2, and more particularly, as shown in the solid line of FIG. 5, the circlip member 5 is in contact with or seated in the round seat portion $S_0$ of the engagement groove 3*a* of the piston 3. From this state, as the piston advances or retracts a small distance in accordance with slack or tension in the chain or belt, the circlip member 5 moves along with the piston 3 and travels longitudinally in the guide groove 20. In addition, a dot shown in each of FIGS. 2 to 4 designates the position of the round seat portion $S_0$ where the circlip member 5 was seated at first.

When the piston 3 advances or protrudes from the state shown in FIG. 2, the circlip member 5 that has been seated in the round seat portion $S_0$ of the engagement groove 3*a* of the piston 3 moves along with the piston 3 and comes into contact with the front side stop 20*a* of the guide groove 20 of the housing 2, as shown in FIG. 3(*a*). Then, when the piston 3 advances farther, as shown in FIG. 3(*b*), the advance permitting portion $S_0S_2$ (see FIG. 5) of the engagement groove 3*a* of the piston 3 enlarges the circlip member 5 and travels over the circlip member 5, thereby allowing for advance of the piston 3.

On the other hand, when tension in the chain or belt increases due to resonance of a span and so on, an excessive shock load from the chain or belt acts on the piston 3 of the tensioner 1, causing the piston 3 to retract.

At the time of such retraction of the piston 3, the circlip member 5, which has been seated in the round seat portion $S_0$ of the engagement groove 3*a* of the piston 3, moves along with the piston 3 as shown in FIG. 4(*a*) and comes into contact with the rear side stop 20*b* of the guide groove 20 of the housing 3.

When the piston 3 moves farther, the circlip member 5 moves along the round surface $S_0C_1$ (see FIG. 5) of the piston-retraction restricting portion $S_0S_1$ of the engagement groove 3*a* of the piston 3, as shown in FIG. 4(*b*). During such movement, the circlip member 5 elastically deforms to expand and travels a short distance in the forward direction along the rear side stop 20*b* of the guide groove 20.

Thereby, the impact can be relieved when the circlip member 5 impacts the rear side stop 20*b* of the guide groove 20, and the impact sound can thus be decreased at the time of piston retraction.

Also, in this case, when the circlip member 5 travels to the round surface $C_1S_1$ (see FIG. 5) of the piston-retraction restricting portion $S_0S_1$ of the engagement groove 3*a* of the piston 3, the round surface $C_1S_1$ comes into surface-contact with the circlip member 5 (see FIG. 6). Thereby, the circlip member 5 is securely sandwiched between the rear side stop 20*b* of the guide groove 20 and the round surface $C_1S_1$, and retraction of the piston 3 can be securely restricted.

In the above-mentioned first embodiment, the surface $C_1S_1$ of the piston-retraction restricting portion $S_0S_1$ of the engagement groove 3*a* of the piston 3 was round, but the present invention is not limited to such an example.

The surface $C_1S_1$ may be formed of a tapered surface that is connected to the round surface $S_0C_1$, that leaves the axial centerline of the piston bore 2*a* toward the front side and inclines relative to the axial centerline of the piston bore 2*a*, and that is formed so as to gradually narrow the distance between the tapered surface and the rear side stop 20*b* of the guide groove 20 toward the front side, or that is formed parallel to the rear side stop 20*b* of the guide groove 20.

In this case, when the circlip member 5 travels to the tapered surface $C_1S_1$ of the piston-retraction restricting portion $S_0S_1$ of the engagement groove 3*a* of the piston 3, the circlip member 5 is sandwiched between the tapered surface $C_1S_1$ and the rear side stop 20*b* of the guide groove 20, thereby securely restricting retraction of the piston 3.

In the above-mentioned first embodiment, the surface $S_0C_1$ of the piston-retraction restricting portion $S_0S_1$ of the engagement groove 3*a* of the piston 3 was round, but the present invention is not limited to such an example.

The surface $S_0C_1$ may have a tapered surface that is continuously connected to both the round seat portion $S_0$ and the round surface $C_1S_1$, and that leaves the axial centerline of the piston bore 2*a* toward the front side and inclines relative to the axial centerline of the piston bore 2*a*. The tapered surface inclines relative to the rear side stop 20*b* of the guide groove 20 in such a manner as to enlarge the distance between the rear side stop 20*b* of the guide groove 20 and the tapered surface toward the front side.

In this case, during retraction of the piston 3, when the circlip member 5, which has been seated in the round seat portion $S_0$ of the engagement groove 3*a* of the piston 3, moves along with the piston 3 and comes into contact with the rear side stop 20*b* of the guide groove 20 of the housing 3, the circlip member 5 travels along the tapered surface of the piston-retraction restricting portion $S_0C_1$ of the engagement groove 3*a* of the piston 3. Thereby, similar to the first embodiment, the circlip member 5 elastically deforms to expand and travels a short distance toward the front side along the rear side stop 20*b* of the guide groove 20.

Thereby, the impact can be relieved when the circlip member 5 impacts the rear side stop 20*b* of the guide groove 20, and the impact sound can thus be decreased at the time of piston retraction.

Also, in this case as well, when the circlip member 5 is transferred to the round surface $C_1S_1$ (see FIG. 5) of the piston-retraction restricting portion $S_0S_1$ of the engagement groove 3*a* of the piston 3, the circlip member 5 is secured by the round surface $C_1S_1$ in surface-contact with the circlip member 5. Thereby, the circlip member 5 can be securely sandwiched between the round surface $C_1S_1$ and the rear side stop 20b of the guide groove 20, thus securely restricting retraction of the piston 3.

In the above-mentioned first embodiment and the other embodiments described above, at least either one of the surfaces $S_0C_1$ and $C_1S_1$ of the piston-retraction restricting portion $S_0S_1$ of the engagement groove 3a of the piston 3 was a round surface, but the present invention is not limited to such an example.

The surface $S_0C_1$ may be formed of a first tapered surface that is continuously connected to the round seat portion $S_0$ and that leaves the axial centerline of the piston bore 2a toward the front side and inclines relative to the axial centerline of the piston bore 2a. The surface $C_1S_1$ may be formed of a second tapered surface that leaves the axial centerline of the piston bore 2a toward the front side and inclines relative to the axial centerline of the piston bore 2a, and that is formed in such a manner as to gradually narrow the distance between the second tapered surface and the rear side stop 20b of the guide groove 20 toward the front side, or that is formed parallel to the rear side stop 20b of the guide groove 20. The first tapered surface inclines relative to the rear side stop 20b of the guide groove 20 so as to enlarge the distance between the rear side stop 20b of the guide groove 20 and the first tapered surface toward the front side.

In this case, during retraction of the piston 3, when the circlip member 5 seated at the round seat portion $S_0$ of the engagement groove 3a of the piston 3 moves along with the piston 3 and comes into contact with the rear side stop 20b of the guide groove 20 of the housing 3, the circlip member 5 moves along the first tapered surface of the surface $S_0C_1$ of the piston-retraction restricting portion $S_0S_1$ of the piston engagement groove 3a, and the circlip member elastically deforms to expand and travels a short distance toward the front side along the rear side stop 20b of the guide groove 20. Thereby, the impact can be relived when the circlip member 5 impacts the rear side stop 20b of the guide groove 20, thus decreasing the impact sound at the time of retraction of the piston 3.

Then, when the circlip member 5 travels to the second tapered surface of the surface $C_1S_1$ of the piston-retraction restricting portion $S_0S_1$ of the piston engagement groove 3a, the circlip member 5 is securely sandwiched between the second tapered surface and the rear side stop 20b of the guide groove 20, thereby securely restricting retraction of the piston 3.

Figure 7:
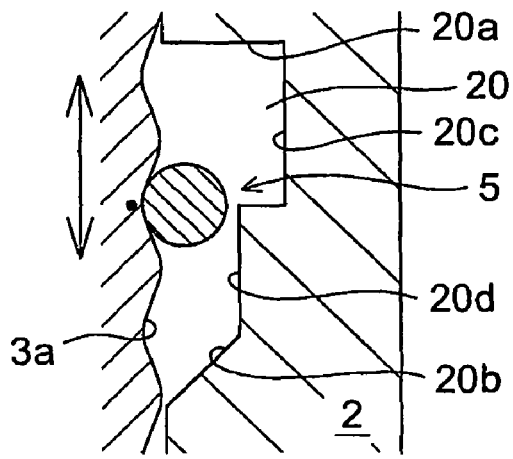
FIG. 7 is an enlarged view of a tensioner according to an alternative embodiment of the present invention, illustrating the action of the ratchet mechanism during normal operation.
Figure 8:
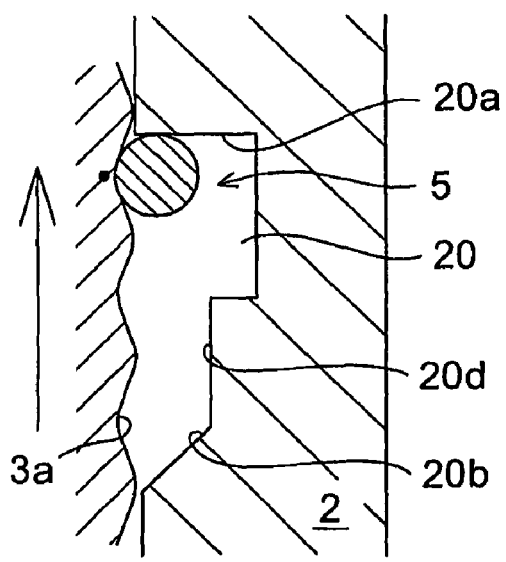
FIG. 8 illustrates the action of the ratchet mechanism of FIG. 7 at the time of piston advance.
Figure 8:
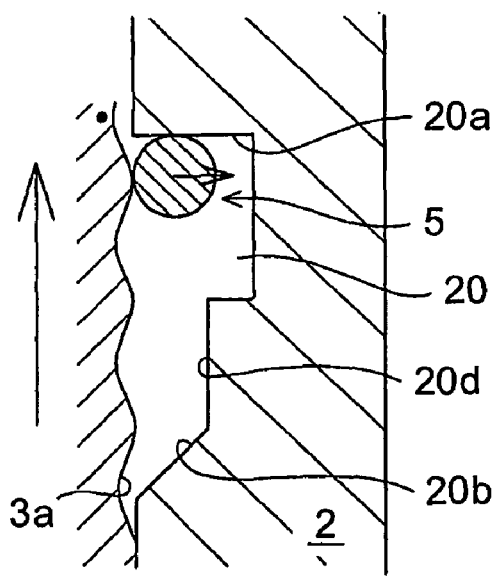
Figure 9:
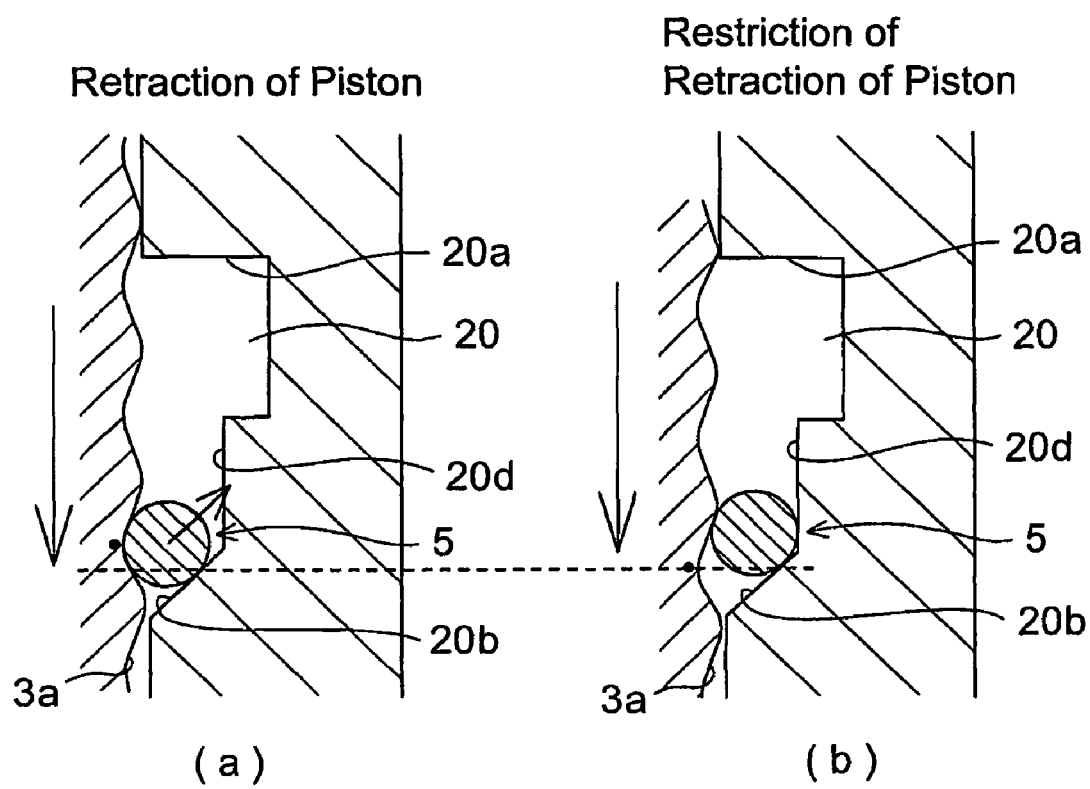
FIG. 9 illustrates the action of the ratchet mechanism of FIG. 7 at the time of piston retraction.
Figure 10:
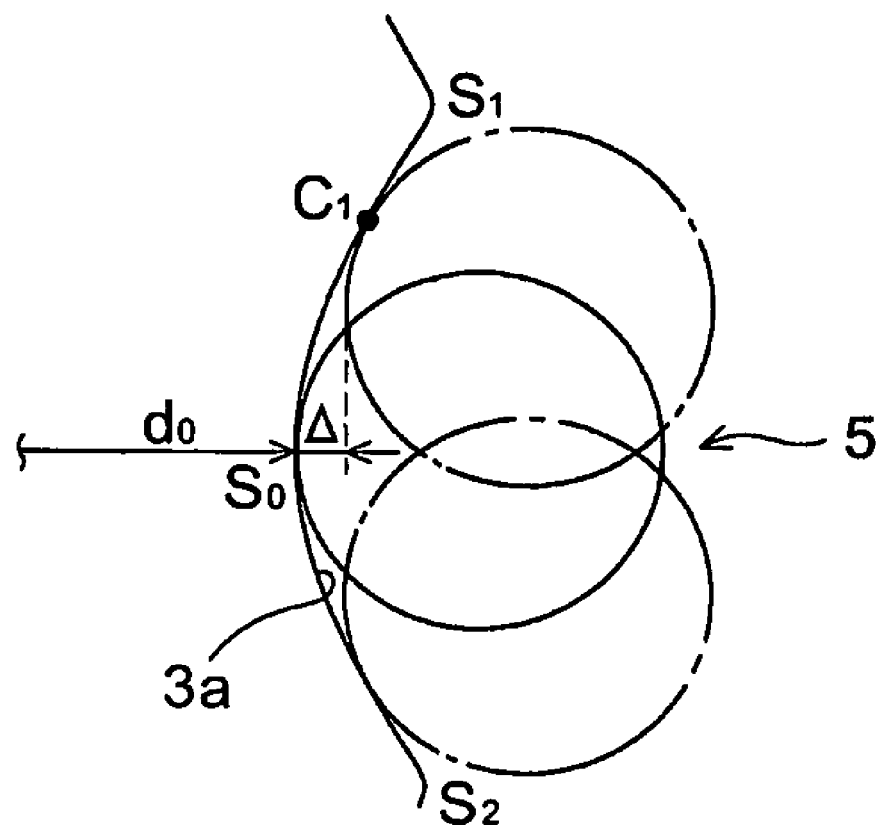
FIG. 10 is an enlarged view of the engagement groove of the piston and the circlip member of the ratchet mechanism of FIG. 7.
Figure 11:
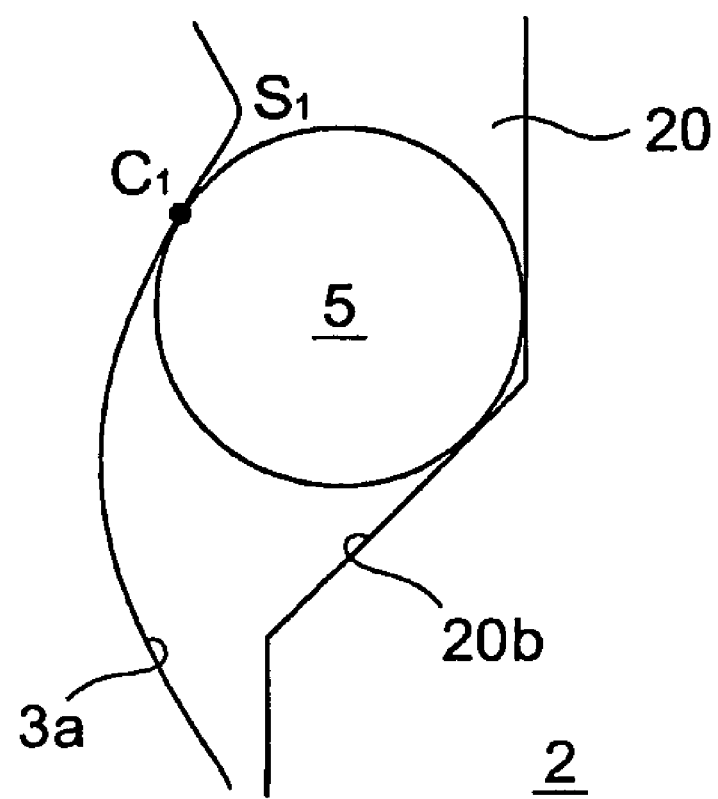
FIG. 11 is a schematic illustrating the action of the ratchet mechanism of FIG. 7 at the time of restricting of piston-retraction, corresponding to the enlarged view of a portion of FIG. 9(b).

FIGS. 7 to 11 show a tensioner with a ratchet mechanism according to another embodiment of the present invention. FIGS. 7 to 9 illustrate the action of the ratchet mechanism. FIG. 10 is an enlarged view of the engagement groove of the piston and the circlip member. FIG. 11 illustrates the action of the ratchet mechanism at the time of restricting of piston-retraction, corresponding to the enlarged view of a portion of FIG. 9(b). In these drawings, like reference numbers indicate identical or functionally similar elements.

In the above-mentioned first embodiment, the surface $C_1S_1$ of the piston-retraction restricting portion $S_0S_1$ of the engagement groove 3a of the piston 3 is formed of the round surface having a radius of curvature substantially equal to a radius of curvature of a cross sectional shape of the circlip member 5 and the circlip member 5 comes into surface-contact with the surface $C_1S_1$ at the time of retraction of the piston 3, but the application of the present invention is not limited to such an example.

As shown in FIG. 10, the surface $C_1S_1$ may be formed of a flat surface that contacts the round surface $S_0C_1$. At this juncture, as shown in FIG. 11, the surface $C_1S_1$ is formed of a tapered surface that inclines relative to the rear side stop 20b in such a manner as to enlarge the distance between the rear side stop 20b of the guide groove 20 and the surface $C_1S_2$ toward the front side.

At the cylindrical surface 20c between the front side stop 20a and the rear side stop 20b in the guide groove 20 of the housing 3, an expansion restricting surface 20d is formed to restrict expansion of the circlip member 5 at the time of retraction of the piston 3. The expansion restricting surface 20d is connected to the rear side stop 20b and is formed of a cylindrical surface extending parallel to the axial centerline of the piston bore 2a and having a radius smaller than a radius of the cylindrical surface 20c.

As with the first embodiment, the piston-advance permitting portion $S_0S_2$, which is formed at the rear of the round seat portion $S_0$ of the engagement groove 3a of the piston 2, is configured in such a manner as to permit advance of the piston 3 when the circlip member 5 contacts the front side stop 20a of the engagement groove 20 and also configured in such a manner as to travel over the circlip member 5 when the piston 3 protrudes farther.

Also, similar to the first embodiment, when the circlip member 5 is in contact with point $C_1$, clearance $\Delta$ is formed between the circlip member 5 and the round seat portion $S_0$, or the deepest portion of the engagement groove 3a. Therefore, when the circlip member 5 is transferred from the position of the round seat portion $S_0$ to the position in contact with point $C_1$, the circlip member 5 is expanded by the amount of clearance $\Delta$.

Then, the action of the above-mentioned tensioner will be explained using FIGS. 7 to 11.

During normal operation of the tensioner 1, as shown in FIG. 7, the circlip member 5 is located in the guide groove 20 of the housing 2. At this juncture, the circlip member 5, as shown in a solid line of FIG. 10, is in contact with the round seat portion $S_0$ of the engagement groove 3a of the piston 3. From this state, when the piston 3 advances or retracts a short distance in accordance with tension or slack in the chain or belt, the circlip member 5 moves along with the piston 3 longitudinally in the guide groove 20. A dot shown in each of FIGS. 7 to 9 designates a position of the round seat portion $S_0$ where the circlip member 5 was seated at first.

From the state shown in FIG. 7; when the piston 3 advances or protrudes, the circlip member 5 seated at the round seat portion $S_0$ of the engagement groove 3a of the piston 3 moves along with the piston 3, as shown in FIG. 8(a), the circlip member 5 comes into contact with the front side stop 20a of the guide groove 20 of the housing 2. Then, from this state, when the piston 3 protrudes farther, the advance-permitting portion $S_0S_2$ (see FIG. 10) of the engagement groove 3a of the piston 3 expands the circlip member 5 and travels over the circlip member 5. Thereby, advance of the piston 3 is permitted.

On the other hand, when tension in the chain or belt increases due to resonance of the span and so on, an excessive shock load from the chain or belt acts on the piston 3 of the tensioner 1 to retract the piston 3.

During such retraction of the piston 3, as shown in FIG. 9(a), the circlip member 5 seated at the round seat portion $S_0$ of the engagement groove 3a of the piston 3 moves along with the piston 3 and comes into contact with the rear side stop 20b of the guide groove 20 of the housing 3.

Then, when the piston 3 further retracts, as shown in FIG. 9(b), the circlip member 5 travels over the round surface $S_0C_1$ (see FIG. 10) of the piston-retraction restricting portion $S_0S_1$ of the engagement groove 3a of the piston 3. Then, the circlip member 5 elastically deforms to expand and travels a short distance toward the front side along the rear side stop 20b of the guide groove 20.

Thereby, the impact can be relieved when the circlip member 5 impacts the rear side stop 20b of the guide groove 20, thus decreasing the impact sound at the time of retraction of the piston 3.

Also, when the circlip member 5 is transferred to the flat surface $C_1S_1$ (see FIG. 10) of the piston-retraction restricting portion $S_0S_1$ of the engagement groove 3a of the piston 3, the circlip member 5 is sandwiched between the flat surface $C_1S_1$, the rear side stop 20b of the guide groove 20, and the expansion restricting surface 20d. Thereby, expansion of the circlip member 5 can be securely prevented, and thus retraction of the piston 3 can be securely restricted.

In the above-mentioned embodiment shown in FIGS. 7 to 11, the piston-retraction restricting portion $S_0S_1$ of the engagement groove 3a of the piston 3 is formed of the round surface $S_0C_1$, and the flat surface $C_1S_1$ in contact with the round surface $S_0C_1$, but the application of the present invention is not limited to such an example.

The piston-retraction restricting portion $S_0S_1$ may be formed of a round surface that has a radius of curvature greater than a radius of curvature of a cross sectional shape of the circlip member 5 and that is configured to enlarge the distance between the rear side stop 20b of the guide groove 20 and the piston-retraction restricting portion $S_0S_1$ toward the front side.

Preferably, similar to the above-mentioned embodiment in FIGS. 7 to 11, an expansion restricting surface 20d that has a cylindrical surface of a radius smaller than a radius of the cylindrical surface 20c and that extends parallel to the axial centerline of the piston bore 2a is formed in the guide groove 20 of the housing 3 to restrict expansion of the circlip member 5 at the time of retraction of the piston 3.

In this case as well, in accordance with the travel of the circlip member 5 toward the front side along the piston-retraction restricting portion $S_0S_1$ of the engagement groove 3a of the piston 3, clearance formed between the circlip member 5 and the round seat portion $S_0$, or the deepest portion of the engagement groove 3a, gradually increases and the circlip member 5 is enlarged by the amount of the increase in the clearance.

Thereby, during retraction of the piston 3, when the circlip member 5 contacts the rear side stop 20b of the guide groove 20 of the housing 3, the circlip member 5 elastically deforms to expand and travels a short distance toward the front side along the rear side stop 20b of the guide groove 20. As a result, the impact can be relieved when the circlip member 5 impacts the rear side stop 20b of the guide groove 20 and thus the impact sound at the time of retraction of the piston 3 can be decreased.

Also, in this case as well, after the short travel of the circlip member 5, the circlip member 5 is sandwiched between the piston-retraction restricting portion $S_0S_1$, the rear side stop 20b of the guide groove 20, and the expansion restricting surface 20d. Thereby, expansion of the circlip member 5 can be securely prevented, thus restricting retraction of the piston 3 securely.

In the above-mentioned embodiments, the amount of travel of the piston 3 due to the short travel of the circlip member 5 is predetermined at 0.1 to 0.2 mm approximately.

INDUSTRIAL APPLICABILITY

A tensioner according to the present invention is useful for automotive industry. Because the tensioner can decrease the impact sound when the piston retracts.

The invention claimed is:

1. A tensioner that imparts tension to a chain comprising:
   a piston having a plurality of engagement grooves on its outer circumferential surface;
   an expandable circlip member fitted around the engagement groove; and
   a housing comprising: a piston bore including an axial centerline and a guide groove, the piston bore receiving the piston slidably in the axial direction and having an opening end, the guide groove formed along the inner circumferential surface of the piston bore on the opening end side, the guide groove having a front side stop and a rear side stop that the circlip member is adapted to contact during travel of the piston,
   wherein the engagement groove of the piston is formed of a round seat portion that has a deepest portion of the engagement groove between a front side of the round seat portion and a rear side of the round seat portion and that the circlip member is adapted to seat, a piston-retraction restricting portion that is formed on the front side of the round seat portion, and a piston-protrusion permitting portion that is formed on the rear side of the round seat portion,
   wherein the piston-protrusion permitting portion is formed in such a manner as to permit protrusion of the piston when the circlip member contacts the front side stop of the guide groove during the protrusion of the piston and as to permit the piston-protrusion permitting portion to travel over the circlip member when the piston travels farther, and
   wherein the piston-retraction restricting portion is formed in such a manner as to permit a short travel of the circlip member in the forward direction along the rear side stop of the guide groove to allow extension of the circlip member and to restrict retraction of the piston when the circlip member contacts the rear side stop of the guide groove during retraction of the piston.

2. The tensioner according to claim 1, wherein the rear side stop of the guide groove of the housing is formed of a tapered surface that leaves the axial centerline of the piston bore toward the front side and that inclines relative to the axial centerline of the piston bore, wherein the piston-retraction restricting portion of the engagement groove of the piston is formed of a first round surface that is formed continuously with the round seat portion and that has a radius of curvature greater than a radius of curvature of a cross sectional shape of the circlip member and a second round surface that is formed continuously with the first round surface and that has a radius of curvature substantially equal to the radius of curvature of the cross sectional shape of the circlip member, and wherein, and wherein the second round surface holds the circlip member to sandwich the circlip member with the tapered surface of the guide groove and the second round surface at the time of restriction of piston-retraction and acts to restrict extension of the circlip member.

3. The tensioner according to claim 1, wherein the rear side stop of the guide groove of the housing is formed of a tapered surface that leaves the axial centerline of the piston bore toward the front side and that inclines relative to the axial centerline of the piston bore, wherein the piston-retraction restricting portion of the engagement groove of the piston is formed of a round surface that is connected continuously to the round seat portion and that has a radius of curvature greater than a radius of curvature of a cross sectional shape of the circlip member, and a tapered surface that is connected to the round surface, that leaves the axial centerline of the piston bore toward the front side and inclines relative to the axial centerline of the piston bore, and that gradually narrows a distance between the tapered surface and the rear side stop of the guide groove toward the front side or that is parallel to the rear side stop of the guide groove, and wherein the tapered surface at the piston-retraction restricting portion sandwiches the circlip member with the tapered surface of the guide groove and the tapered surface at the time of restriction of piston-retraction and acts to restrict extension of the circlip member.

4. The tensioner according to claim 1, wherein the rear side stop of the guide groove of the housing is formed of a tapered surface that leaves the axial centerline of the piston bore toward the front side and that inclines relative to the axial centerline of the piston bore, wherein the piston-retraction restricting portion of the engagement groove of the piston is formed of a tapered surface that is formed continuously with the round seat portion, that leaves the axial centerline of the piston bore toward the front side, and that inclines relative to the axial centerline of the piston bore, and a round surface that is formed continuously with the tapered surface and that has a radius of curvature substantially equal to a radius of curvature of a cross sectional shape of the circlip member, and wherein the round surface holds the circlip member to sandwich the circlip member with the tapered surface of the guide groove and the round surface at the time of restriction of piston-retraction and acts to restrict extension of the circlip member.

5. The tensioner according to claim 1, wherein the rear side stop of the guide groove of the housing is formed of a tapered surface that leaves the axial centerline of the piston bore toward the front side and that inclines relative to the axial centerline of the piston bore, wherein the piston-retraction restricting portion of the engagement groove of the piston is formed of a first tapered surface that is connected continuously to the round seat portion and that leaves the axial centerline of the piston bore toward the front side and inclines relative to the axial centerline of the piston bore, and a second tapered surface that is connected to the first tapered surface, that leaves the axial centerline of the piston bore toward the front side and inclines relative to the axial centerline of the piston bore, and that gradually narrows a distance between the second tapered surface and the rear side stop of the guide groove toward the front side or that is parallel to the rear side stop of the guide groove, and wherein the second tapered surface sandwiches the circlip member with the tapered surface of the guide groove and the second tapered surface at the time of restriction of piston-retraction and acts to restrict extension of the circlip member.

6. The tensioner according to claim 1, wherein the rear side stop of the guide groove of the housing is formed of a tapered surface that leaves the axial centerline of the piston bore toward the front side and that inclines relative to the axial centerline of the piston bore, and wherein the piston-retraction restricting portion of the engagement groove of the piston has a tapered surface on the front side that is inclined relative to the tapered surface of the guide groove so as to enlarge a distance between the tapered surface of the guide groove and the tapered surface of the engagement groove.

7. The tensioner according to claim 6, wherein the guide groove has an enlargement restricting surface formed thereon that connects the rear side stop to sandwich the circlip member between the piston-retraction restricting portion of the engagement groove and the enlargement restricting surface to restrict the enlargement of the circlip member at the time of restriction of piston-retraction.

8. The tensioner according to claim 1, wherein the rear side stop of the guide groove of the housing is formed of a tapered surface that leaves the axial centerline of the piston bore toward the front side and that inclines relative to the axial centerline of the piston bore, and wherein the piston-retraction restricting portion of the engagement groove of the piston has a round surface that is formed in such a manner as to enlarge a distance between the tapered surface of the guide groove and the round surface toward the front side and that has a radius of curvature greater than a radius of curvature of a cross sectional shape of the circlip member.

9. The tensioner according to claim 8, wherein the guide groove has an enlargement restricting surface formed thereon that connects the rear side stop to sandwich the circlip member between the piston-retraction restricting portion of the engagement groove and the enlargement restricting surface to restrict the enlargement of the circlip member at the time of restriction of piston-retraction.

10. The tensioner according to claim 9, wherein the enlargement restricting surface is formed of a cylindrical surface parallel to the axial centerline of the piston bore.

11. The tensioner according to claim 1, wherein the amount of a travel of the piston caused by the short travel of the circlip member is 0.1 to 0.2mm.

12. A tensioner with a ratchet mechanism to restrict retraction of a piston, the tensioner having an expandable circlip member adapted to engage with engagement grooves formed around the outer circumferential surface of the piston, the engagement groove of the piston is formed of a round seat portion that has a deepest portion of the engagement groove between a front side of the round seat portion and a rear side of the round seat portion and that the circlip member is adapted to seat, and a guide groove formed along an inner circumferential surface of a piston bore, the guide groove having a rear side stop; wherein the engagement groove is formed in such a manner as to permit the circlip to seat in the engagement groove until contacting the rear side stop at the time of piston retraction; and wherein the engagement groove is formed in such a manner as to permit a short travel of the circlip member toward a distal end of the piston at the time of further piston retraction, after the circlip member has contacted the rear side stop to enlarge the circlip member.

13. The tensioner according to claim 12, wherein the amount of a travel of the piston caused by the short travel of the circlip member is 0.1 to 0.2mm.

* * * * *